May 23, 1961     H. MEIER-EBERT     2,985,051
SHEARING MACHINES
Filed April 9, 1957

Inventor
HEINZ MEIER-EBERT

BY Robert H. Jacob
AGENT

United States Patent Office 2,985,051
Patented May 23, 1961

2,985,051

SHEARING MACHINES

Heinz Meier-Ebert, Oberhausen, Rhineland, Germany, assignor to Huttenwerk Oberhausen Aktiengesellschaft, Oberhausen, Germany, a German company Filed Apr. 9, 1957, Ser. No. 651,670

Claims priority, application Germany Apr. 21, 1956

1 Claim. (Cl. 83—345)

This invention relates to improvements in shearing machines and more particularly to shears consisting of rotatable knives for the cutting of lengths of material.

Hot rolled material is usually cut with flying shears or with pivoting shears. Shears of this kind are comparatively complicated and expensive. In addition they are liable to jam. In many cases it has therefore been proposed to use shears with rotating knives in a simple arrangement which in respect to manufacturing costs and maintenance are more favourable.

With these known shears the upper knife and the lower knife have straight cutting edges directed crosswise to the length of the rolled material and an equal height therefrom. Each knife is placed on a knife carrier which is located on a shaft. The axes of the shafts lie over one another in a vertical direction. Their speeds are the same. The separation or cutting of the material is effected at the point at which the axis of the rolled material cuts through an imaginary connecting line of the axes of rotation of the knife carriers. Each point of the cutting edges of the knife has the same distance from the axis of rotation of the appropriate knife carrier whereby each point of the cutting edges of the upper knife and each point of the cutting edges of the lower knife have peripheral speeds equal to one another. The distance between the cutting edge of the upper knife and the axis of its carrier is therefore equal to the distance between the cutting edge of the lower knife and the axis of rotation of its carrier so that theoretically the sum of the two distances is equal to the distance of the two axes of rotation. Hereby it is assumed that the knives after the cutting is completed can slide by one another.

With these known shears only material having a simple section such as flat and round bars can be cut. Bars of non-regular section, such an angle or U-irons, are considerably deformed in cutting with shears of the aforementioned kind. Rolled material with cut ends so deformed cannot be treated in the straightening machine as it blocks the straightening machine.

The provision of said shears with profiled cutting knives, having their cutting edges corresponding to the profile of the rolled material, does not give any satisfactory results. With the use of profile knives the cutting edge does not form a straight but an angular line so that every point of the cutting edges is not at the same distance from the axis of rotation of the associated knife carrier. According to the section of the material to be cut there are points or rows of points on the angular cutting edge which have a shortest distance from the associated axis of rotation and those which have the greatest distance from the associated axis of rotation. The sums of the greatest distance between corresponding points of the angular cutting edge of the upper knife with one another and the angular cutting edge of the lower knife are greater than the distance of the axes of rotation of the two knife carriers from one another. The consequence thereof is that when cutting is attempted the knives cannot slide past one another as the upper knife and the lower knife obstruct each other so that a cut cannot be effected.

The object of the present invention is to provide shears capable of cutting lengths from continuously moving material and a further object is to provide such shears which are capable of cutting material of irregular section.

According to the invention the machine comprises two rotary knives, carriers on which the knives are adjustably mounted, one carrier being longer than the other whereby the peripheral speeds of the knives differ to cause one knife to slide over the other during the cutting operation.

The knives can have irregular cutting edges corresponding to the section to be cut through and different points on the cutting edges of the knives have speeds differing from one another which permit the knives to slide over one another with the points of the cutting edge of one knife adjacent the corresponding points of the cutting edge of the other knife whereby the cutting edges are laterally displaced from a line connecting the axes of rotation so that the cut is effected before the knives reach the connecting line. Thus the knives can slide over one another without mutual obstruction during the cutting since one knife leads the other knife. In addition the displaced position of the knives compared with the connecting line through the axes of rotation results in that the cutting takes place very quickly on a short path of the cut material, as the cutting path passed over in a given time is increased by the lateral displacement towards the cut of the connecting line of the axes of rotation. The result of this in that deformations of the cutting material at the cut point are reduced to a minimum.

It is advisable to set the knives relative to their axes of rotation at such an angular position that the knives at the cutting point are vertical to the axis of the cut material. This promotes the effect of preventing a deformation of material at the cutting point during the cutting.

Thus the cutting takes place not in the location where the axis of the material being cut is at right angles to the line connecting the axes of rotation of the knife carriers, but laterally and ahead of this connecting line along the direction of feed. In accordance with the invention this is accomplished by suitable choice of the distance of the cutting edges of the knives from their axes of rotation.

If the angular velocity of the knife carriers is the same the points at the cutting edge of one knife with respect to the corresponding points along the cutting edge of the other knife have different peripheral velocities. Consequently the one knife runs ahead of the other knife so that the cutting edges of both knives can slide past one another making possible the cutting of any desired profiles. In order to obtain the required different peripheral velocities with equal angular velocities, the radius from the axis of rotation to the cutting edge of one knife must be greater than the radius of the axis of rotation of the other knife to its cutting edge. In carrying the invention into practice this condition is fulfilled in that the knife carriers are of unequal lengths as set forth hereinabove.

The advancing speed of the material to be cut may be the average peripheral speeds of the cutting points of one knife and the corresponding cutting points of the other knife.

The arrangement preferably comprises an upper and a lower knife, so positioned that the rear side of the upper knife slides past the leading surface of the lower knife and the points of its cutting edge have a greater peripheral speed than corresponding points on the lower knife edge. This has the advantage that the upper knife cannot obstruct the advance of the material to be cut, and the lower knife rises to the material to be cut without obstructing its advance.

In order to synchronise the two knives it is preferred to rotate them at equal angular speeds but carried at unequal distances from their respective axes of rotation. Thus the knife carriers are of unequal length, the length of the carrier of the lower knife preferably being equal to or smaller than half the distance apart of the axes of rotation of the knife carriers.

It is also advantageous to locate the knives adjustably on the knife carrier in order thus to be able to adjust the knives in accordance with the ratios required at the time.

One embodiment of the invention will be described with reference to the accompanying drawings in which.

Figure 1:
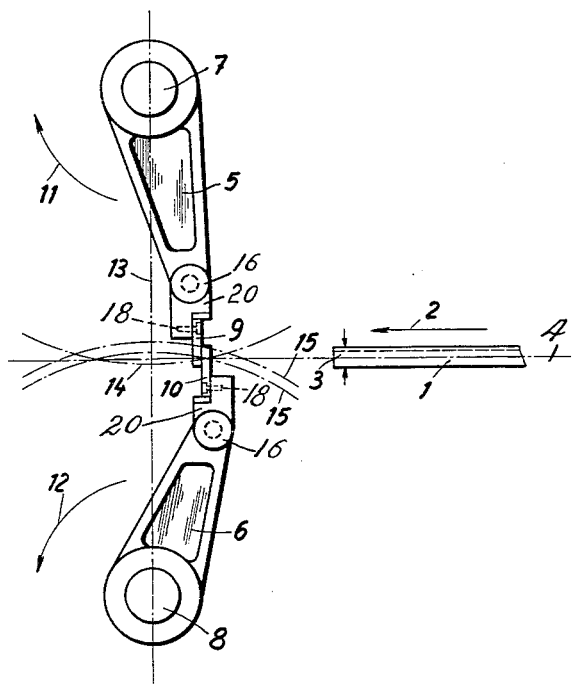
Fig. 1 is a side view of the shears.
Figure 2:
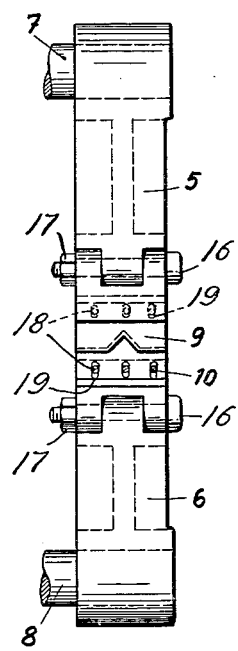
Fig. 2 is an end elevation seen in the direction of advance of the material to be cut.

The rolling direction or advancing direction of the hot rolled material 1 which in the embodiment has an angled profile, is indicated in Fig. 1 by the arrow 2. 3 indicates the height and 4 the middle axis of the material to be cut.

The shears consist of two knife carriers 5 and 6 which are arranged on shafts 7 and 8 and rotate at the same angular speed in the direction of the arrows 11 and 12. On the knife carriers are located knives 9 and 10 the cutting edges of which are disposed at angles corresponding to these of the section to be cut. The arm 5 carrying the upper knife 9 is longer than the arm 6 carrying the lower knife 10. The arrangement is such that the upper knife 9 leads the lower knife 10.

The knives are secured to the knife carriers in such an angular position that they are perpendicular to the axis of the material being cut at the location of cutting. The position of the knives relative to their carriers is not changed during rotation.

The length of the knife carriers and their angular position to their axes of rotation on shafts 7 and 8 respectively is so selected that the cutting is effected before the material reaches a connection line 13 of the axes of rotation. For this purpose the knives are so arranged on the carriers that at the beginning of the cut they are at right angles to the center axis 4 of the material to be cut. The length of the carrier 6 of the lower knife 10 in the embodiment shown is smaller than half the distance of the axes of the shafts 7 and 8 from one another.

The knives are adjustable in height on the knife carriers. The knives 9 and 10 are provided with elongated apertures whereby they are adjustable by means of screws 18 which extend therethrough into the supports 20 on carriers 5 and 6. The supports 20 are connected to the carriers 5 and 6 by means of bolts 16 in a manner that they can be adjusted to the desired angular position. This is necessary to make it possible to adjust the knives at the cutting location or cutting plane relative to the direction of feed in accordance with the requirements of the size and construction of the tools. The securing of the supports 20 relative to the carriers 5 and 6 in a predetermined angular position may be effected by means of nuts 17 fastened onto bolts 16.

The method of operation is as follows:

The hot rolled material 1 of angular section coming from the rolling process runs in the direction of the arrow 2 to the shears, the knife carriers 5 and 6 of which rotate continuously. Alternatively a rotation of the knife carriers with interruptions outside the cutting point is also possible.

The cutting procedure is seen from the position shown in Fig. 1. The angled cutting edges of the knives describe, in cutting, concentric circles around the axes of rotation which are indicated for the upper knife 9 by means of the dot and dash circle line 14 and for the lower knife by means of the dot and dash lines 15.

I claim:

A shearing machine having upper and lower knives rotating at equal angular velocities for cutting lengths of profiled rolled material irregular in cross-section, a pair of carriers of different lengths each supporting one of said knives and a pair of synchronously rotating shafts each supporting one said carrier, said knives being flat and having irregular cutting edges corresponding to the profile of the material to be cut with the cutting points of each knife disposed in a plane, one said knife edge having all of its cutting points at a distance from the axis of rotation of the carrier associated therewith smaller than the distance of all corresponding points of the cutting edge of the other knife from the axis of rotation of the other carrier, the sum of the distance of each point on one cutting edge and of the distance of the corresponding point of the other cutting edge from the associated axes of rotation being greater than the distance of the axes of rotation from one another, and said knives being positioned on their respective carriers in the position of commencement of cut with said planes containing said cutting points adjacent and parallel to each other and perpendicular to the axis of the material being cut, thereby providing for all points of the cutting edges of one knife traveling at a different peripheral speed than and sliding linearly past the corresponding points of the other knife, and said knives being inclined at a fixed angle with respect to the radial lines of their circles of rotation and in the same direction relative to the direction of rotation.

References Cited in the file of this patent

UNITED STATES PATENTS

| | | |
|---|---|---|
| 613,322 | Schuermann | Nov. 1, 1898 |
| 971,022 | Cooper | Sept. 27, 1910 |
| 1,398,474 | Strawn | Nov. 29, 1921 |
| 1,749,430 | Iversen | Mar. 4, 1930 |
| 1,814,867 | Swift | July 14, 1931 |
| 2,125,939 | Macfarren | Aug. 9, 1938 |
| 2,246,957 | Shields | June 24, 1941 |
| 2,868,292 | Hitchcock | Jan. 13, 1959 |

FOREIGN PATENTS

| | | |
|---|---|---|
| 309,584 | Germany | Nov. 30, 1918 |